(No Model.)

J. C. PARKER.
LINE GUIDE FOR FISHING RODS.

No. 396,707. Patented Jan. 22, 1889.

Witnesses.
John N. Parks
Mark M. Powers

Inventor,
Joel C. Parker.
By his Attorney
Luther V. Moulton.

UNITED STATES PATENT OFFICE.

JOEL C. PARKER, OF GRAND RAPIDS, MICHIGAN.

LINE-GUIDE FOR FISHING-RODS.

SPECIFICATION forming part of Letters Patent No. 396,707, dated January 22, 1889.

Application filed July 9, 1888. Serial No. 279,454. (No model.)

*To all whom it may concern:*

Be it known that I, JOEL C. PARKER, a citizen of the United States, residing at Grand Rapids, in the county of Kent and State of Michigan, have invented certain new and useful Improvements in Line-Guides for Fishing-Rods; and I do hereby declare the following to be a full, clear, and exact description of the invention, such as will enable others skilled in the art to which it appertains to make and use the same.

My invention relates to improvements in the guides attached to fishing-rods, through which guides the line passes, and which permit said line to run freely when wound upon or unwound from the reel. Heretofore such guides have consisted of some form of closed ring or eye, through which the end of the line is passed in attaching said line for use.

The objects of my invention are to provide a guide that will permit the insertion of the line at any portion of its length and avoid the necessity of passing its end through the guide; also, to prevent the line from becoming unintentionally detached from said guide, particularly the guide at the end of the rod; also, to permit of closer packing when the rod is out of use. I accomplish these results by the mechanism illustrated in the accompanying drawings, in which—

Figures 1 and 2 are respectively end and side views of a portion of a rod having a device attached embodying my invention; Figs. 3 and 4, the same having a modified form of guide; Figs. 7 and 8, still another modification, showing different attaching devices for the guide; and Figs 5 and 6, the form of device adapted to the end of the rod.

Like letters refer to like parts in all the figures.

A represents the rod.

B represents the line; C, C', C'', and D, the various forms of line-guides, which consist, essentially, of one or more turns of a spiral coil of wire, (or other suitable material,) the turns of which are (or will spring) sufficiently open to allow the passage of the line between them, and attached to the rod either by a prolongation of the wire in line with the axis of the coil or by a strap passing through the coil, or by any other suitable means.

Figs. 2 and 3 represent a guide consisting of a single wire having two convolutions or turns of the coil, which is attached to the rod in like manner as before described.

Figure 7:
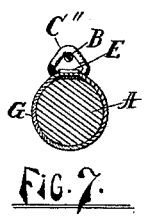
Figure 8:
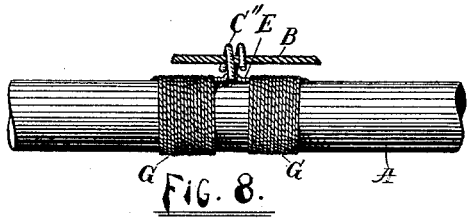

Figs. 7 and 8 represent a modified form consisting of about one and one-half turn of a spiral coil which is bent into a triangular form, one angle being at or near the middle of the overlapping part of said coil and secured to the rod by a strap, E, passing through the said coil, said strap having a curved part at or near the middle embracing the side of the triangle opposite the before-described angle of the coil and secured to the rod by a seizing, G G. Said strap may be folded upon itself and secured by a single seizing, if desirable.

The guide attached to the end of the rod is similar to the form C', having the further feature of a prolongation, F, at the opposite end of the coil from that attached to the rod, which prolongation is bent backward near the outside of said coil and substantially parallel with the axis of the same, terminating opposite and at sufficient distance from said end to permit the insertion and removal of the line between the same.

Figure 1:
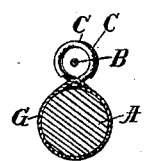
Figs. 1 and 2 show a guide consisting of two single coils turned or open in opposite directions and separately attached by prolongations of the wire constituting the coil, which is secured to the rod by a seizing, G, of fine twine, wire, or other suitable material.
Figure 2:
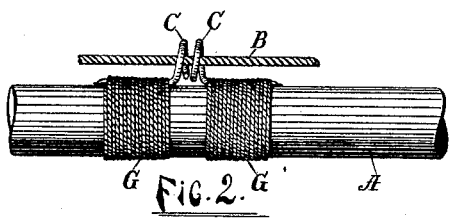
Figure 3:
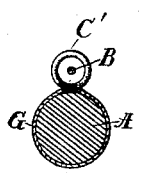
Figure 4:
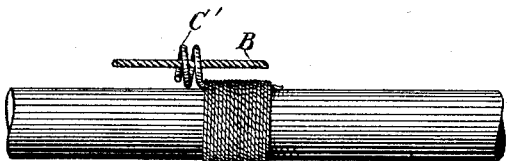
Figure 5:
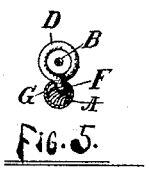
Figure 6:

The operation of my device is as follows: In the form shown in Figs. 1 and 2 the line is inserted by placing any part of the same nearly at right angles to the rod and pressing it through between the coils C C until in contact with the rod, then bringing it in line with the same, when it will pass under the free ends of the respective coils and pass upward into position within the axis of the same, each coil operating to retain the line and prevent its escape under the end of the other. In case of the form shown in Figs. 3 and 4 the line is first passed between the coil and the rod, and then one part is carried into the spiral opening and brought within the coil by a "winding" movement, the line following this spiral opening to its end. The reverse movement is necessary to release the line, first passing it under the free end of the coil and then following the opening between the coils in the opposite direction. In the case of C″ the line is inserted in the same manner as in case of C. By the means of attachment shown in this case the guide is not as likely to be broken off, and will lie down against the rod and permit closer packing of the rod when out of use. In the case of D the process of insertion and removal of the line is the same as in C′, and as when in use the line is frequently returned alongside the rod the extension F is added to prevent the unintentional passing of the line under the free end of the coil, the end H of the rod serving as a fender and keeping the line outside of and away from the part F when said line chances to be in such position that it would otherwise fall between the part F and the coils.

I do not limit myself to the precise forms shown. There may be many modifications of my invention, the essential feature of which is that the guide shall have a lateral opening leading to the guiding-opening, through which lateral opening any portion of the line may be passed by a lateral movement, substantially as described.

What I claim and wish to secure is as follows:

1. A line-guide for fishing-rods, having an opening substantially parallel to the axis of the rod, and a passage through the side of said guide not in contact with the rod, through which the line may be brought within the said opening, the sides of said passage being substantially parallel and arranged at an angle to or spirally around the axis of said opening, substantially as described.

2. A line-guide for fishing-rods, consisting of two or more spiral coils attached to said rod, arranged with the axis of said coils substantially parallel to the axis of said rod, and with space between the turns of said coils for insertion of the line, substantially as described.

3. A line-guide for fishing-rods, consisting of a number of turns of a spiral coil, one end of which is prolonged substantially parallel to the axis of said coil and secured to the rod by a seizing or other suitable fastening, substantially as described.

4. A line-guide for fishing-rods, consisting of one or more turns of a spiral coil attached at one end to the end of the rod, and having the free end extended outside of said coil substantially parallel with the axis of the same and terminating opposite the end of said rod, and adapted to permit the insertion of the line by passing the same between the respective turns of the coil, substantially as described.

5. A line-guide for fishing-rods, consisting of substantially one and one-half turn of a spiral coil having substantially a triangular form, one angle thereof being near the middle of the overlapping part of said coil and secured to the rod by a strap or other suitable fastening engaging with the side of the triangle opposite said angle, substantially as described.

In testimony whereof I affix my signature in presence of two witnesses.

JOEL C. PARKER.

Witnesses:
ALBERT W. BEMIS,
LUTHER V. MOULTON.